(12) United States Patent
Sogawa et al.

(10) Patent No.: US 6,931,651 B2
(45) Date of Patent: Aug. 16, 2005

(54) OPTICAL PICKUP

(75) Inventors: Teruaki Sogawa, Osaka (JP); Fumiaki Mori, Osaka (JP); Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 126 days.

(21) Appl. No.: 10/661,539

(22) Filed: Sep. 15, 2003

(65) Prior Publication Data

US 2004/0076107 A1 Apr. 22, 2004

(30) Foreign Application Priority Data

Sep. 19, 2002 (JP) .................................... P2002-272894

(51) Int. Cl.$^7$ .......................... G11B 7/085; G11B 17/00
(52) U.S. Cl. .................................. 720/685; 369/244.1
(58) Field of Search ............................... 720/685, 683; 369/219.1, 247.1, 244.1; 359/814, 824

(56) References Cited

U.S. PATENT DOCUMENTS

2003/0035358 A1 * 2/2003 Ito ........................ 369/112.01

2003/0123374 A1 * 7/2003 Matsumura et al. ........ 369/215
2003/0161251 A1 * 8/2003 Shimada et al. ............ 369/244
2004/0114496 A1 * 6/2004 Sogawa et al. ............. 369/120

FOREIGN PATENT DOCUMENTS

JP          6-36294          2/1994

* cited by examiner

Primary Examiner—Allen Cao
(74) Attorney, Agent, or Firm—Morgan, Lewis & Bockius LLP (57) ABSTRACT

An optical pickup has a pair of left and right leg portions formed integrally at both side edge portions of a rear end portion of a resilient plate. The leg portions extend forwardly along a horizontal longitudinal direction. A pair of fixing holes are penetratingly provided in the respective leg portions on a transverse phantom line passing through a central portion of the resilient plate and extending in a horizontal transverse direction and at positions spaced apart an equal interval from a longitudinal phantom line passing through the central portion of the resilient plate and extending in the horizontal longitudinal direction. A pair of fixing screws are screwed into a pair of threaded holes in a mounting surface of a base through the fixing holes, thereby fixing the leg portions to the mounting surface.

9 Claims, 8 Drawing Sheets

OPTICAL PICKUP

BACKGROUND OF THE INVENTION

1. Field of the Invention

The present invention relates to an optical pickup for use in a disk player such as a CD player or a DVD player, and more particularly to an optical pickup in which a photodiode can be positioned precisely.

2. Description of the Related Art

JP-A-6-36294 discloses conventional techniques regarding optical pickups. JP-A-6-36294 discloses an optical detecting device including: an optical detector having first and second surfaces; an elastic fixing member to which the first surface of the optical detector is attached; and a fixing portion provided on a portion of the elastic fixing member to which the optical detector is attached.

In the above-described construction, the coefficient of linear expansion differs between the optical detector and the elastic fixing member. Therefore, the central axis of a photodiode disposed in the optical detector is likely to be offset from the optical axis of the laser light in the horizontal longitudinal direction when a high-temperature/low-temperature test (e.g., 60 centigrade to 0 centigrade) prior to shipment is effected or due to a change in the ambient temperature at the place of use. Consequently, an error can possibly occur in the reading by the photodiode.

SUMMARY OF THE INVENTION

In view of the above-described drawback, an object of the invention is to provide an optical pickup which makes it possible to maintain the accuracy of reading by the photodiode at a high level by reducing the effect of a temperature change.

To attain the above object, according to a first aspect of the invention, there is provided an optical pickup including: a synthetic resin-made base in which a collimator lens and an objective lens are disposed at one end opening of a light passage hole with a half mirror, the base having a mounting surface formed on another end opening of the light passage hole that is penetrating the base; a laser diode disposed in a laser hole communicating with the light passage hole; a resilient plate made of a leaf spring having a central through hole, a first end portion secured to the mounting surface in such a manner as to be heightwise adjustable by an adjusting screw, a pair of left and right hinge portions formed by cutting out a slit in the vicinity of a second end portion that is opposite to the first end portion, and a pair of left and right leg portions formed integrally at both side edge portions of the second end portion, the leg portions extending toward the first end portion along a horizontal longitudinal direction; and a printed circuit board with a photodiode, the printed circuit board secured to the resilient plate in face-to-face relation to the central through hole while being positioned in the horizontal longitudinal direction and a horizontal transverse direction; wherein laser light is projected from the laser diode onto a disk through the half mirror, the collimator lens, and the objective lens, and reflected light thereof is received by the photodiode through the half mirror and the central through hole in the resilient plate, so as to read information recorded on the disk; a pair of fixing holes are respectively formed in the leg portions in such a manner as to be provided on a transverse phantom line passing through a central portion of the resilient plate and at positions spaced apart an equal interval from a longitudinal phantom line passing through the central portion of the resilient plate and extending in the horizontal longitudinal direction; a pair of threaded holes are formed in the mounting surface in such a manner as to be provided on a transverse phantom line passing through a central portion of the base and extending in the horizontal transverse direction and at positions spaced apart an equal interval from a longitudinal phantom line passing through the central portion of the base and extending in the horizontal longitudinal direction; an elongated engaging hole is penetratingly provided in one of the leg portions along the horizontal longitudinal direction; an elliptical positioning projection is projectingly provided on the mounting surface in face-to-face relation to the engaging hole; a support pedestal which is one step higher is integrally formed at an end portion of the mounting surface; the resilient plate and the leg portions are positioned on the mounting surface by engaging the positioning projection with the engaging hole; and fixing screws are respectively screwed into the threaded holes through the fixing holes in the leg portions, so as to fix the leg portions to the mounting surface and press the second end portion of the resilient plate against the support pedestal.

According to the above-described construction, with respect to the horizontal transverse direction, the fixing screws for fixing the leg portions of the resilient plate to the mounting surface are disposed at positions spaced apart an equal interval from the central portion of the resilient plate. Therefore, the stress of expansion and the stress of contraction occurring along the horizontal transverse direction using the fixing screws as a reference are offset from each other, so that the central portion of the resilient plate is prevented from becoming offset from the central portion of the base. In addition, with respect to the horizontal longitudinal direction, since the positions of the fixing screws and the position of the central portion of the base are aligned with each other, the central portion of the resilient plate is prevented from becoming offset from the central portion of the base due to the stress of expansion and the stress of contraction occurring along the horizontal longitudinal direction using the fixing screws as a reference. Accordingly, the effect of a temperature change is extremely small, and the photodiode provided in the central portion of the resilient plate is set in a state of being fixed to the central portion of the base. Thus, even when a high-temperature/low-temperature test prior to shipment is effected or when the optical pickup is subjected to a change in the ambient temperature at the place of use, the central axis of the photodiode is prevented from becoming offset from the optical axis of the laser light. Hence, the accuracy of reading by the photodiode can be maintained at a high level.

In addition, since the rear end portion of the resilient plate is pressed against the support pedestal of the mounting surface, at the time when the positioning of the photodiode is effected by moving the printed circuit board, which is disposed on the resilient plate, by fine adjustment in the horizontal direction, the rear end portion of the resilient plate is not swung vertically. The photodiode can thus be positioned precisely in the vertical direction.

Further, as the elliptical positioning projection provided projectingly on the mounting surface is merely engaged with the elongated engaging hole provided penetratingly in one leg portion, the resilient plate can be disposed at a predetermined position on the mounting surface, and each fixing hole can be positioned concentrically with each threaded hole. Therefore, each fixing screw can be speedily and easily screwed into each threaded hole through each fixing hole.

According to a second aspect of the invention, there is provided an optical pickup including: a synthetic resin-made base having a mounting surface formed thereon; a resilient plate made of a leaf spring having a central through hole and a first end portion secured to the mounting surface in such a manner as to be heightwise adjustable by an adjusting screw; a printed circuit board with a photodiode, the printed circuit board secured to the resilient plate in face-to-face relation to the central through hole while being positioned in a horizontal longitudinal direction and a horizontal transverse direction; and a laser diode; wherein laser light is projected from the laser diode onto a disk, and reflected light thereof is received by the photodiode, so as to read information recorded on the disk; a pair of fixing holes are formed in the resilient plate in such a manner as to be provided at positions spaced apart an equal interval from the central through hole interposed between the fixing holes; a pair of threaded holes are formed in the mounting surface in face-to-face relation to the fixing holes; and fixing screws are respectively screwed into the threaded holes through the fixing holes in the leg portions, so as to fix the resilient plate to the mounting surface.

DETAILED DESCRIPTION OF THE PREFFERED EMBODIMENTS

Figure 9:
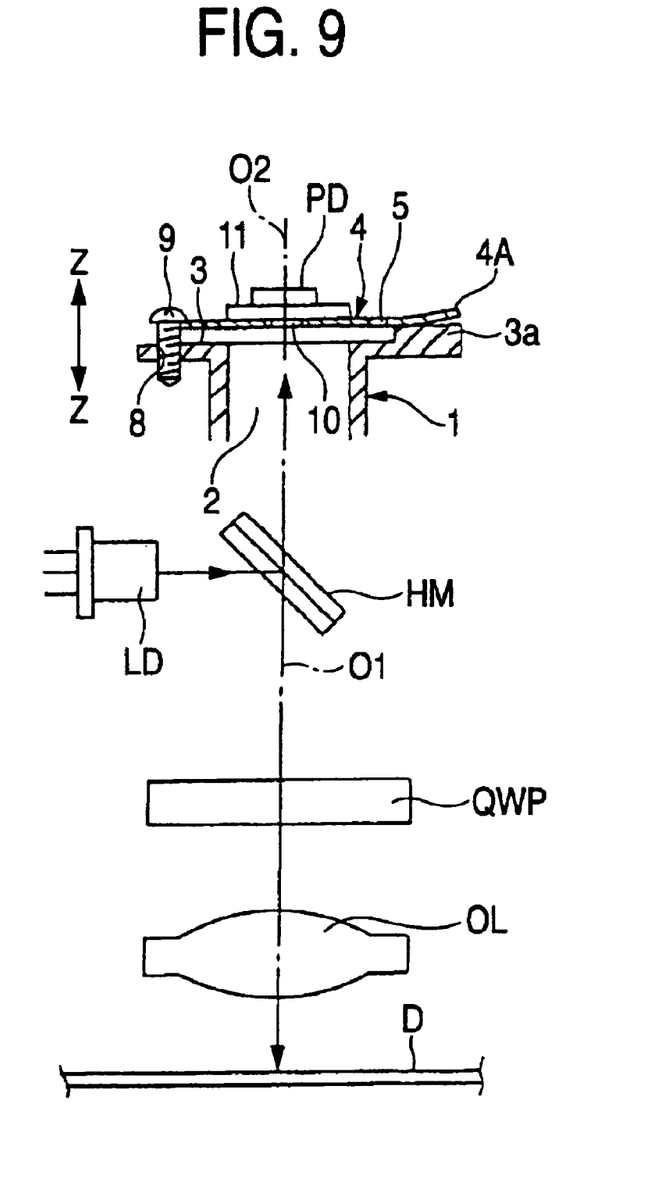
FIG. 9 is a schematic side view showing the optical pickup.

In an optical pickup, as shown in FIG. 9, a collimator lens QWP and an objective lens OL are disposed at one end opening of a light passage hole 2 with a half mirror HM provided penetratingly in a synthetic resin-made base 1. A laser diode LD is disposed in a laser hole communicating with the light passage hole 2. A mounting surface 3 is formed on the base 1, on the other end opening of the light passage hole 2. A support pedestal 3a which is one step higher is integrally formed at a rear end portion of the mounting surface 3. Laser light is projected from the laser diode LD onto a disk D such as CD or DVD through the half mirror HM, the collimator lens QWP, and the objective lens OL, and its reflected light is received by a photodiode PD through the half mirror HM. Information recorded on the disk D is thereby read.

FIGS. 1 to 6 show an optical pickup in accordance with an embodiment of the invention. A support pedestal 3a which is one step higher by a predetermined interval α (e.g., 0.5 to 2 mm) is integrally formed at a rear end portion of the mounting surface 3 of the base 1. A pair of left and right leg portions 4C and 4D formed integrally at both side edge portions of a rear end portion 4A of a resilient plate 4 extend forwardly along a horizontal longitudinal direction Y—Y. A fixing screw 6 fixes each of the leg portions 4C and 4D to the mounting surface 3.

Figure 1:
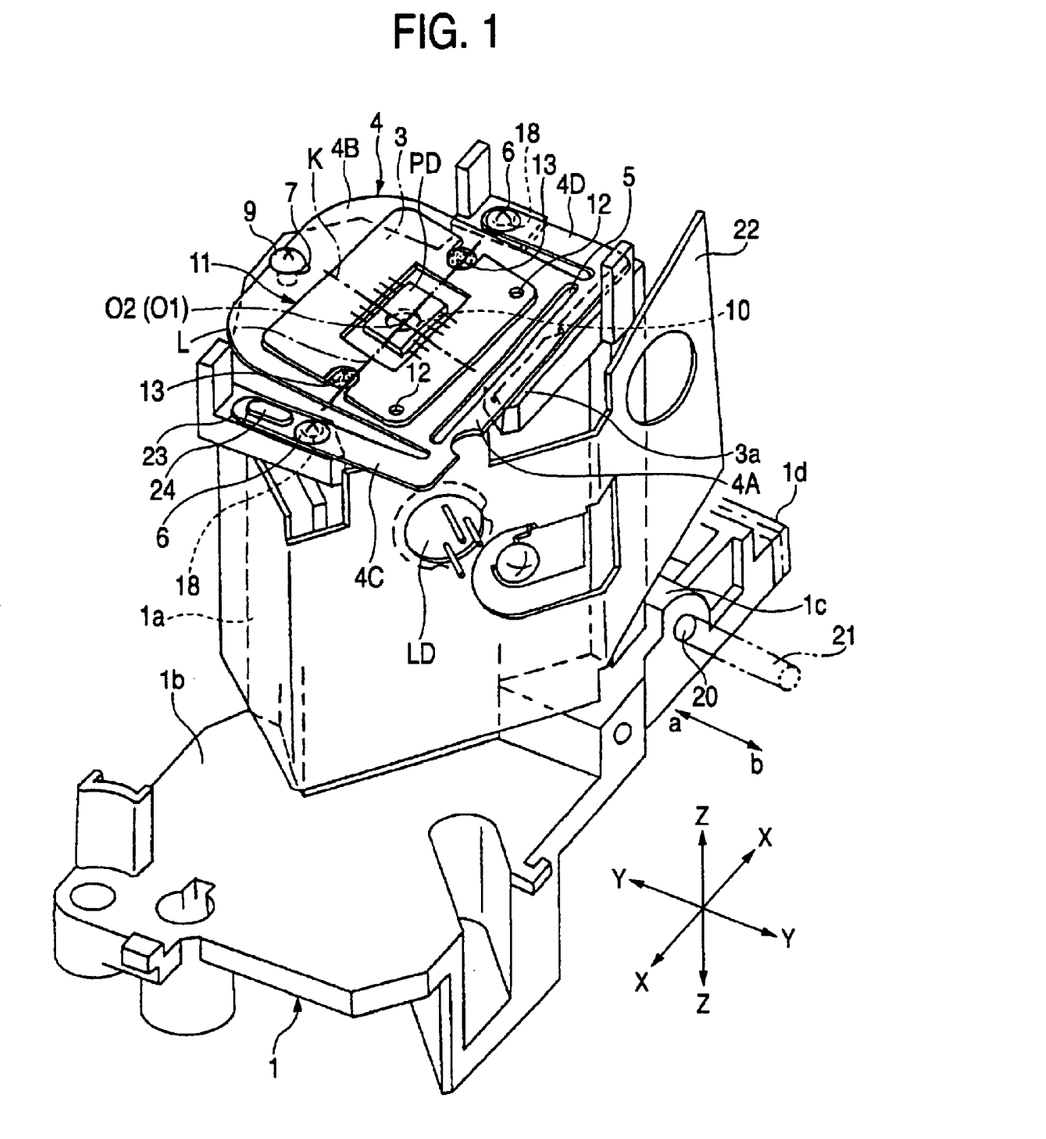
FIG. 1 is a perspective view showing an optical pickup according to an embodiment of the invention.

A pair of right and left hinge portions 4a are cut out by forming a slit 5 in the vicinity of the rear end portion of the resilient plate 4 made of a substantially rectangular leaf spring. As an adjusting screw 9 is screwed into a threaded hole 8 in the mounting surface 3 through an engaging slot 7 formed in a front end portion 4B of the resilient plate 4, the resilient plate 4 is secured to the mounting surface 3 such that its height is adjustable in a vertical direction Z. A printed circuit board 11 with a photodiode PD is secured on the resilient plate 4 in face-to-face relation to a central through hole 10 in the resilient plate 4 by being positioned in a horizontal transverse direction X—X and in a horizontal longitudinal direction Y—Y. In FIG. 1, reference numeral 12 denotes an operation hole provided penetratingly in each corner of a rear portion of the printed circuit board 11, and 13 denotes an ultraviolet-curing adhesive.

As shown in FIG. 1, the base 1 has a tubular base body 1a having the mounting surface 3 formed thereon, a baseplate portion 1b formed integrally on the base body 1a, and a pair of brackets 1c and a rack 1d which are integrally provided projectingly on the baseplate portion 1b. A guide rod 21 is movably fitted in through holes 20 respectively formed in the brackets 1c. As a pinion (not shown) meshing with the rack 1d is rotated forwardly or reversely, the base 1 is moved back and forth a and b along the guide rod 21. It should be noted that reference numeral 22 denotes a radiating plate.

Figure 7:
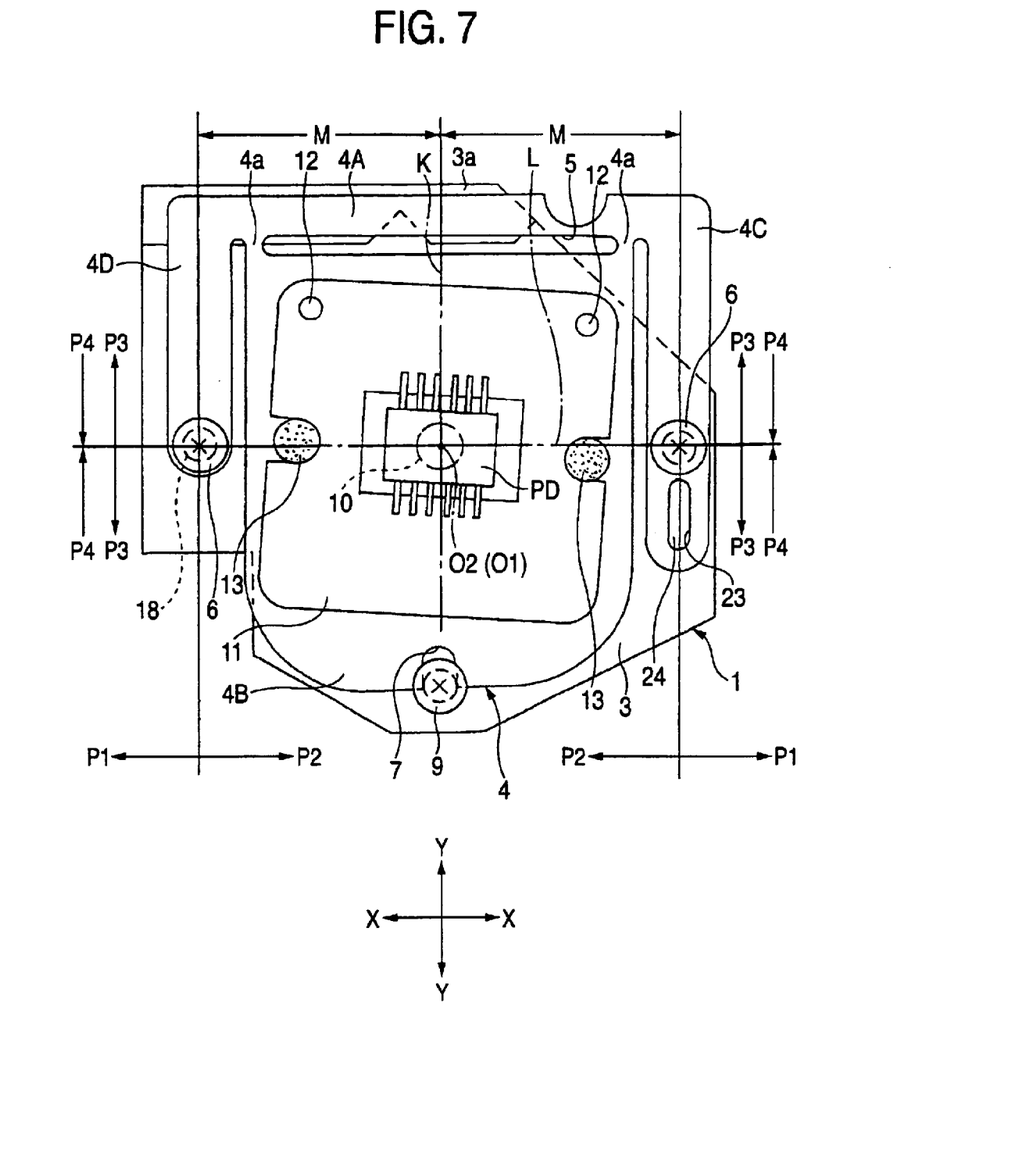
FIG. 7 is a plan view showing a state of fixation of a resilient plate.

As shown in FIG. 7, a pair of fixing holes 18 are penetratingly provided in the respective leg portions 4C and 4D on a transverse phantom line L passing through a central portion of the resilient plate 4 and extending in a horizontal transverse direction X—X and at positions spaced apart an equal interval M from a longitudinal phantom line K passing through the central portion of the resilient plate 4 and extending in the horizontal longitudinal direction Y—Y. Meanwhile, a pair of threaded holes 8 are formed in the mounting surface 3 in such a manner as to be provided on the transverse phantom line L passing through a central portion of the base 1 and extending in the horizontal transverse direction X—X and at positions spaced apart the equal interval M from the longitudinal phantom line K passing through the central portion of the base 1 and extending in the horizontal longitudinal direction Y—Y. As the fixing screws 6 are screwed into the threaded holes 8 through the fixing holes 18, the leg portions 4C and 4D are fixed to the mounting surface 3, the central portion of the resilient plate 4 is aligned with the central portion of the base 1, and the rear end portion 4A of the resilient plate 4 is pressed against the support pedestal 3a.

Figure 2:
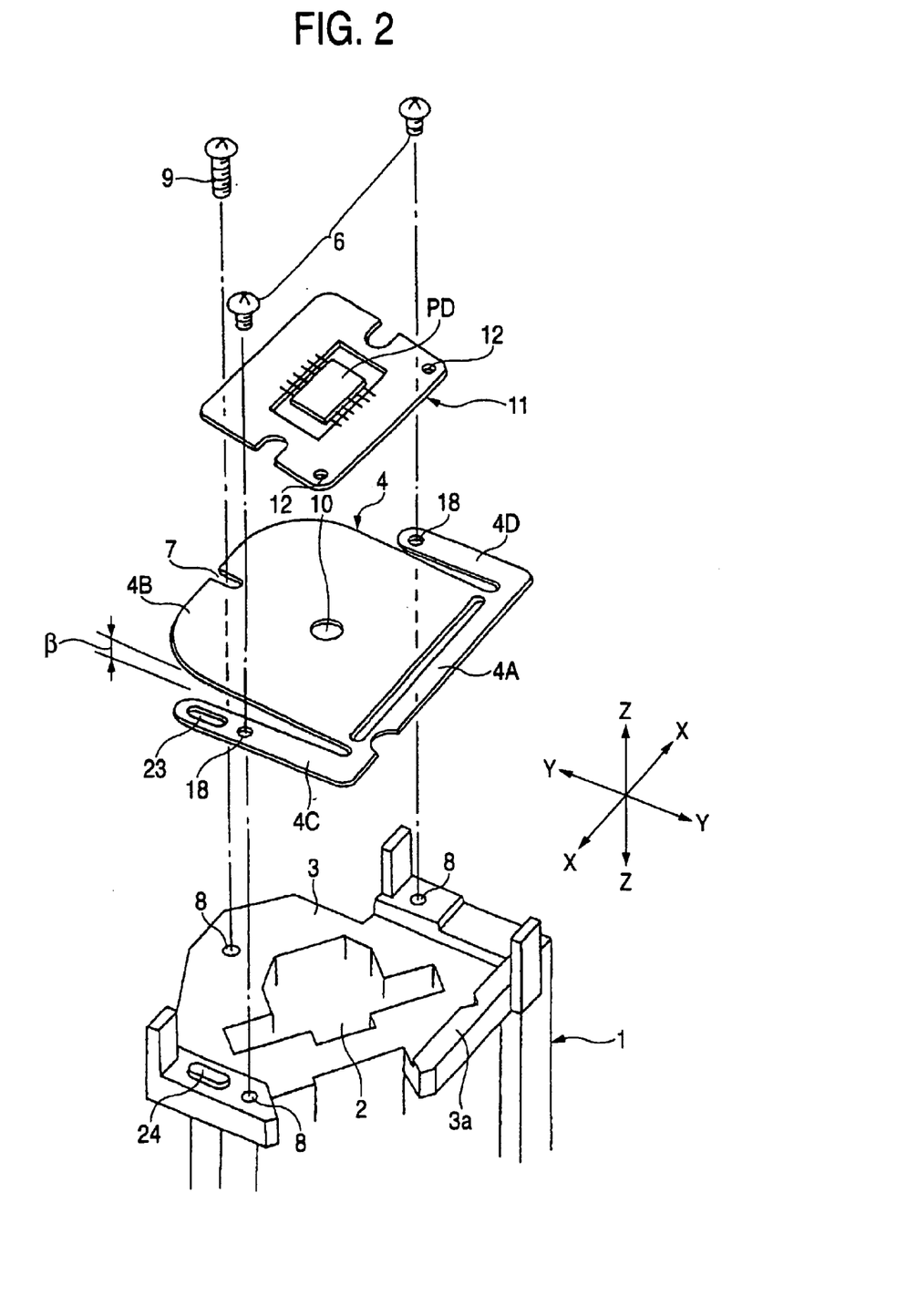
FIG. 2 is an exploded perspective view of essential portions of the optical pickup.
Figure 3:
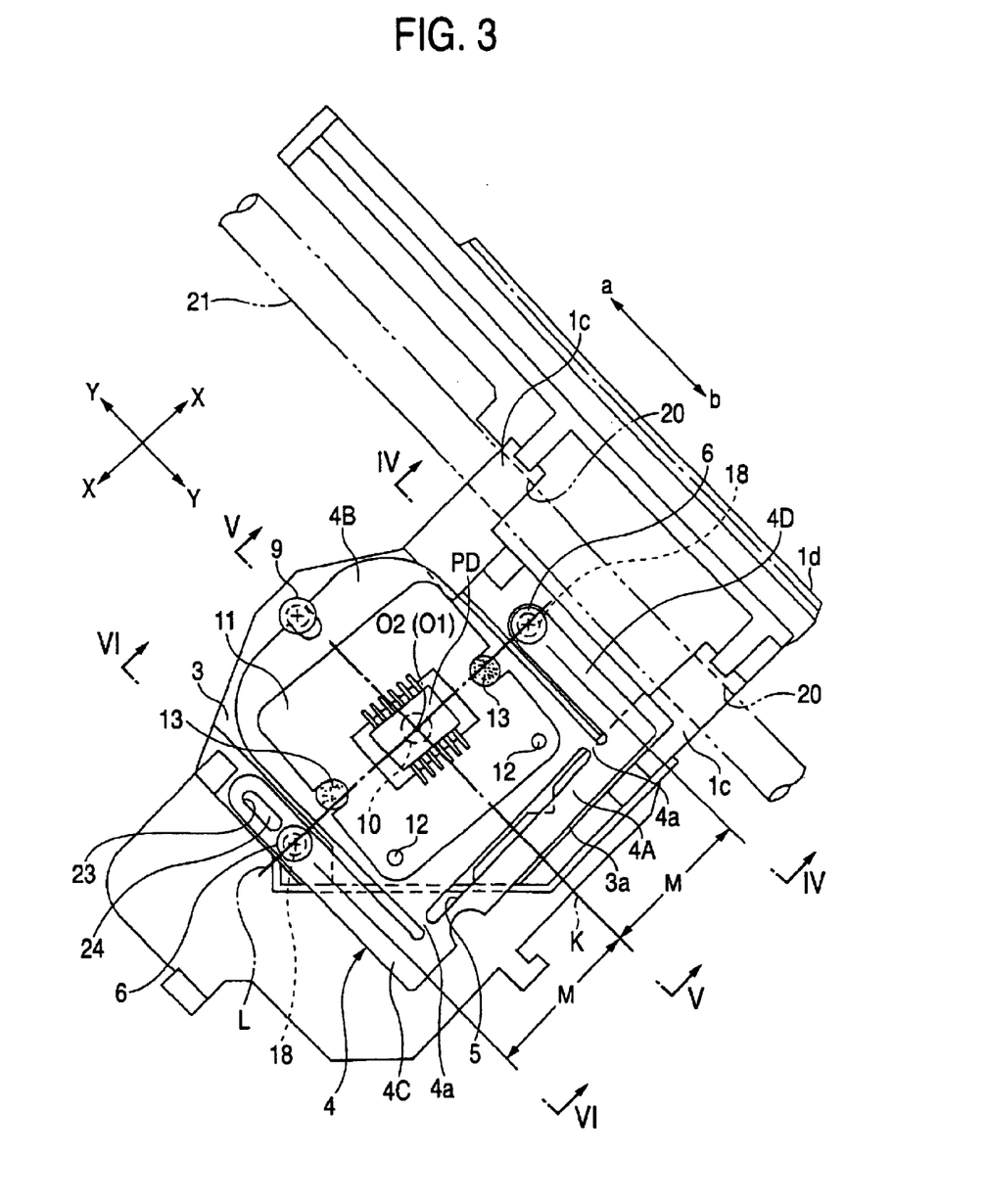
FIG. 3 is a plan view of the optical pickup.
Figure 4:
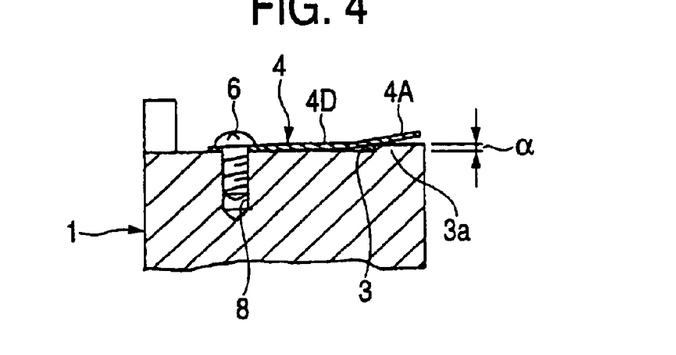
FIG. 4 is a sectional view taken along line IV—IV in FIG. 3.
Figure 5:
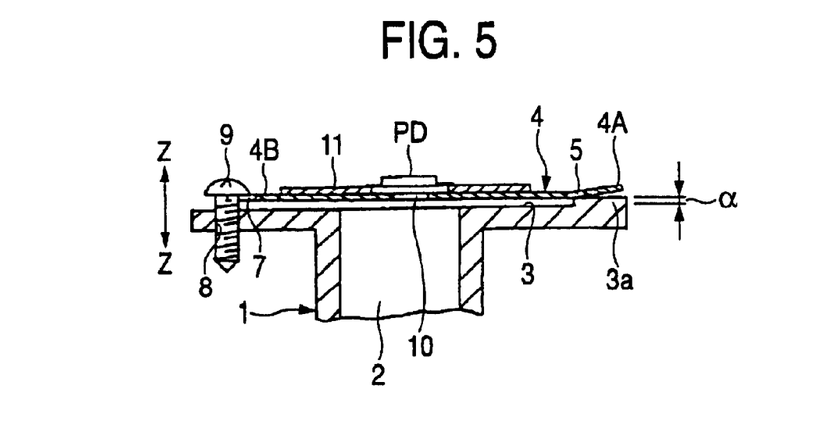
FIG. 5 is a sectional view taken along line V—V in FIG. 3.
Figure 6:
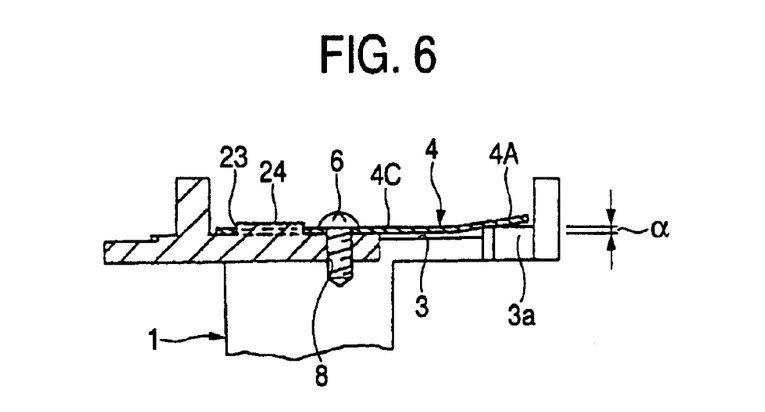
FIG. 6 is a sectional view taken along line VI—VI in FIG. 3.

As shown in FIGS. 2 and 6, an elongated engaging hole 23 is penetratingly provided in one leg portion 4C along the horizontal longitudinal direction Y—Y, and an elliptical positioning projection 24 is projectingly provided on the mounting surface 3 in face-to-face relation to the engaging hole 23. By merely engaging the positioning projection 24 with the engaging hole 23, the resilient plate 4 can be disposed at a predetermined position on the mounting surface 3, and each fixing hole 18 can be positioned concentrically with each threaded hole 8. Therefore, each fixing screw 6 can be speedily and easily screwed into each threaded hole 8 through each fixing hole 18.

A description will be given of the procedure for positioning the photodiode PD. As shown in FIG. 2, the rear end portion 4A of the resilient plate 4 inclined diagonally upward by a predetermined angle β (e.g., 5 to 10 degree) from each of the leg portions 4C and 4D is placed on the support pedestal 3a. Then, as each fixing screw 6 is screwed into the threaded hole 8 through the fixing hole 18 in each of the leg portions 4C and 4D, the leg portions 4C and 4D are fixed to the mounting surface 3, and the rear end portion 4A of the resilient plate 4 is pressed against the support pedestal 3a. Subsequently, an adjusting screw 9 is screwed into the threaded hole 8 in the mounting surface 3 through an engaging slot 7 formed in a front end portion 4B of the resilient plate 4, thereby pressing down the resilient plate 4.

Figure 8A:
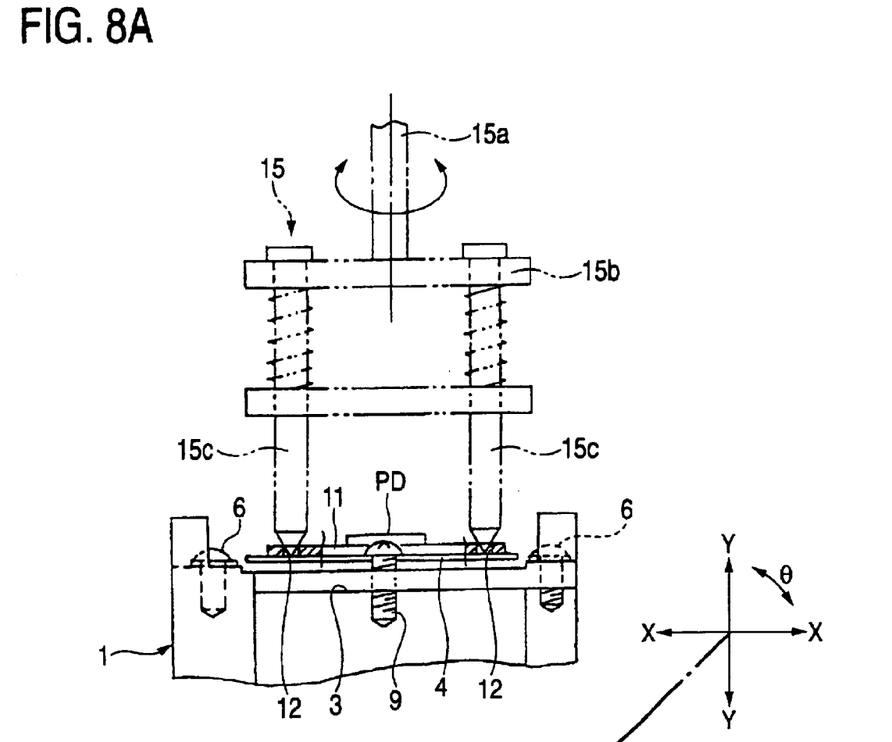
FIG. 8A is a front view of essential portions showing a procedure of positioning a photodiode.
Figure 8B:
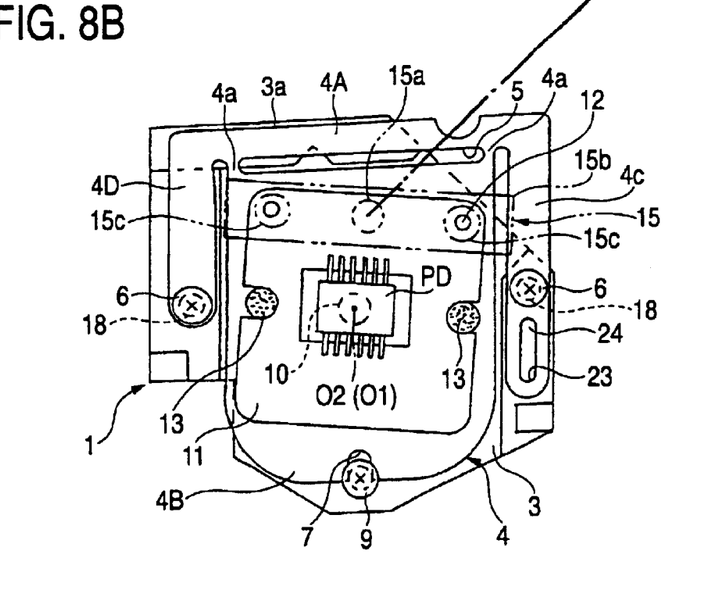
FIG. 8B is a plan view of the essential portions showing the same procedure.

Subsequently, as shown in FIGS. 8A and 8B, a printed circuit board 11 with a photodiode PD is placed on the resilient plate 4, and each engaging pin 15c of a positioning device 15 is engaged in each of both operation holes 12 in the printed circuit board 11. Then, laser light is projected from a laser diode LD onto a CD-use disk D, and the height of the resilient plate 4 is adjusted along the vertical direction Z by operating the adjusting screw 9. Further, the printed circuit board 11 is moved by fine adjustment in the horizontal longitudinal direction Y—Y and in the horizontal transverse direction X—X by operating the positioning device 15. The central axis O2 of a CD-use light-receiving portion of the photodiode PD is thereby aligned with the optical axis O1 of the laser light reflected from the disk D.

Subsequently, laser light is projected onto a DVD-use disk D replaced from the CD-use disk D, and the printed circuit board 11 is appropriately rotated forwardly or reversely about a main shaft 15a in a horizontal direction θ by fine adjustment by operating the positioning device 15. The central axis O2 of a DVD-use light-receiving portion of the photodiode PD is thereby aligned with the optical axis O1 of the laser light reflected from the DVD-use disk D.

Subsequently, an ultraviolet-curing adhesive 13 is applied between the printed circuit board 11 and the resilient plate 4, and ultraviolet rays are radiated to allow the ultraviolet-curing adhesive 13 to cure, thereby securing the printed circuit board 11 to the resilient plate 4.

According to the above-described construction, as shown in FIG. 7, the base 1 is adapted to expand or contract by using its central portion (nearly equal to optical axis O1) as a reference, whereas the resilient plate 4 is adapted to expand or contract by using the fixing screws 6 as a reference. With respect to the horizontal transverse direction X—X, although the respective fixing screws 6 are positionally offset from the central portion of the base 1, the fixing screws 6 are disposed at positions spaced apart the equal interval M from the central portion (nearly equal to central axis O2) of the resilient plate 4. Therefore, the stress of expansion P1 and the stress of contraction P2 occurring along the horizontal transverse direction X—X using the fixing screws 6 as a reference are offset from each other, so that the central portion of the resilient plate 4 is prevented from becoming offset from the central portion of the base 1. In addition, with respect to the horizontal longitudinal direction, since the positions of the fixing screws 6 and the position of the central portion of the base 1 are aligned with each other, the central portion of the resilient plate 4 is prevented from becoming offset from the central portion of the base 1 due to the stress of expansion P3 and the stress of contraction P4 occurring along the horizontal longitudinal direction Y—Y using the fixing screws 6 as a reference. Accordingly, the effect of a temperature change is extremely small, and the photodiode PD provided in the central portion of the resilient plate 4 is set in a state of being fixed to the central portion of the base 1. Thus, even when a high-temperature/low-temperature test prior to shipment is effected or when the optical pickup is subjected to a change in the ambient temperature at the place of use, the central axis O2 of the photodiode PD is prevented from becoming offset from the optical axis O1 of the laser light. Hence, the accuracy of reading by the photodiode PD can be maintained at a high level.

In addition, since the rear end portion 4A of the resilient plate 4 is pressed against the support pedestal 3a of the mounting surface 3, when the positioning of the photodiode PD is effected by moving the printed circuit board 11 disposed on the resilient plate 4 by fine adjustment in the horizontal direction (see FIG. 8), the rear end portion 4A of the resilient plate 4 is not swung vertically. Thus, the photodiode PD can be positioned precisely in a vertical direction Z.

Figure 10:
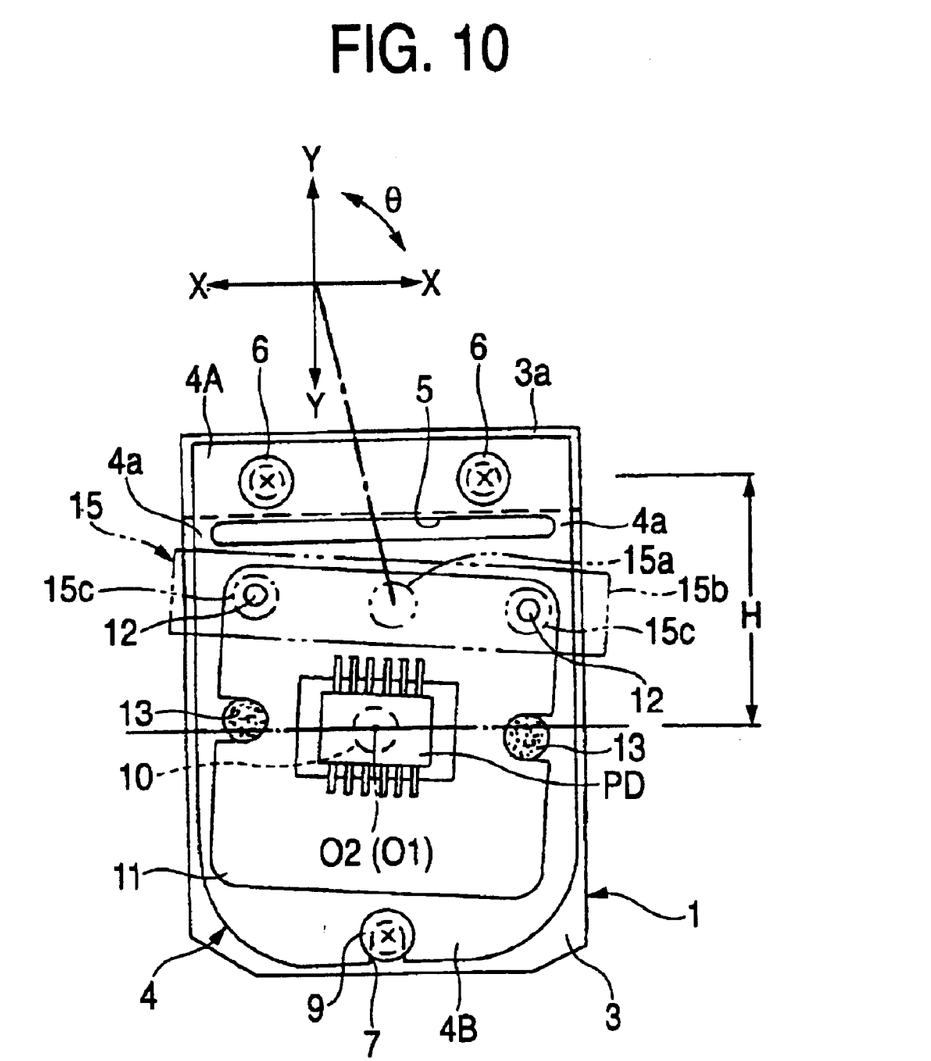
FIG. 10 is a modified example of the optical pickup.

Instead of the above described embodiment, a configuration shown in FIG. 10 may be conceived, in which a rear end portion 4A which is connected to the resilient plate 4 by means of the hinge portions 4a is secured to the support pedestal 3a by a pair of fixing screws 6. In this construction, since the interval H between each of the fixing screw 6, which is a reference for fixing the resilient plate 4, and the photodiode PD is large, as the base 1 is thermally expanded by the heat generated by the laser diode LD, the optical axis O1 of the laser light is likely to be offset from the central axis O2 of the photodiode PD in the horizontal longitudinal direction Y—Y. Consequently, an error can possibly occur in the reading by the photodiode PD.

As was described above, according to the first aspect of the invention, with respect to the horizontal transverse direction, the fixing screws for fixing the leg portions of the resilient plate to the mounting surface are disposed at positions spaced apart an equal interval from the central portion of the resilient plate. Therefore, the stress of expansion and the stress of contraction occurring along the horizontal transverse direction using the fixing screws as a reference are offset from each other, so that the central portion of the resilient plate is prevented from becoming offset from the central portion of the base. In addition, with respect to the horizontal longitudinal direction, since the positions of the fixing screws and the position of the central portion of the base are aligned with each other, the central portion of the resilient plate is prevented from becoming offset from the central portion of the base due to the stress of expansion and the stress of contraction occurring along the horizontal longitudinal direction using the fixing screws as a reference. Accordingly, the effect of a temperature change is extremely small, and the photodiode provided in the central portion of the resilient plate is set in a state of being fixed to the central portion of the base. Thus, even when a high-temperature/low-temperature test prior to shipment is effected or when the optical pickup is subjected to a change in the ambient temperature at the place of use, the central axis of the photodiode is prevented from becoming offset from the optical axis of the laser light. Hence, the accuracy of reading by the photodiode can be maintained at a high level.

In addition, since the rear end portion of the resilient plate is pressed against the support pedestal of the mounting surface, at the time when the positioning of the photodiode is effected by moving the printed circuit board, which is disposed on the resilient plate, by fine adjustment in the horizontal direction, the rear end portion of the resilient plate is not swung vertically. The photodiode can thus be positioned precisely in the vertical direction.

Further, as the elliptical positioning projection provided projectingly on the mounting surface is merely engaged with the elongated engaging hole provided penetratingly in one leg portion, the resilient plate can be disposed at a predetermined position on the mounting surface, and each fixing hole can be positioned concentrically with each threaded hole. Therefore, each fixing screw can be speedily and easily screwed into each threaded hole through each fixing hole.

What is claimed is:

1. An optical pickup comprising:

a synthetic resin-made base in which a collimator lens and an objective lens are disposed at one end opening of a light passage hole with a half mirror, the base having a mounting surface formed on another end opening of the light passage hole that is penetrating the base;

a laser diode disposed in a laser hole communicating with the light passage hole;

a resilient plate made of a leaf spring having a central through hole, a first end portion secured to the mounting surface in such a manner as to be heightwise adjustable by an adjusting screw, a pair of left and right hinge portions formed by cutting out a slit in the vicinity of a second end portion that is opposite to the first end portion, and a pair of left and right leg portions formed integrally at both side edge portions of the second end portion, the leg portions extending toward the first end portion along a horizontal longitudinal direction; and a printed circuit board with a photodiode, the printed circuit board secured to the resilient plate in face-to-face relation to the central through hole while being positioned in the horizontal longitudinal direction and a horizontal transverse direction;

wherein laser light is projected from the laser diode onto a disk through the half mirror, the collimator lens, and the objective lens, and reflected light thereof is received by the photodiode through the half mirror and the central through hole in the resilient plate, so as to read information recorded on the disk;

a pair of fixing holes are respectively formed in the leg portions in such a manner as to be provided on a transverse phantom line passing through a central portion of the resilient plate and at positions spaced apart an equal interval from a longitudinal phantom line passing through the central portion of the resilient plate and extending in the horizontal longitudinal direction;

a pair of threaded holes are formed in the mounting surface in such a manner as to be provided on a transverse phantom line passing through a central portion of the base and extending in the horizontal transverse direction and at positions spaced apart an equal interval from a longitudinal phantom line passing through the central portion of the base and extending in the horizontal longitudinal direction;

an elongated engaging hole is penetratingly provided in one of the leg portions along the horizontal longitudinal direction;

an elliptical positioning projection is projectingly provided on the mounting surface in face-to-face relation to the engaging hole;

a support pedestal which is one step higher is integrally formed at an end portion of the mounting surface;

the resilient plate and the leg portions are positioned on the mounting surface by engaging the positioning projection with the engaging hole; and fixing screws are respectively screwed into the threaded holes through the fixing holes in the leg portions, so as to fix the leg portions to the mounting surface and press the second end portion of the resilient plate against the support pedestal.

2. An optical pickup comprising:

a synthetic resin-made base having a mounting surface formed thereon;

a resilient plate made of a leaf spring having a central through hole and a first end portion secured to the mounting surface in such a manner as to be heightwise adjustable by an adjusting screw;

a printed circuit board with a photodiode, the printed circuit board secured to the resilient plate in face-to-face relation to the central through hole while being positioned in a horizontal longitudinal direction and a horizontal transverse direction; and a laser diode;

wherein laser light is projected from the laser diode onto a disk, and reflected light thereof is received by the photodiode, so as to read information recorded on the disk;

a pair of fixing holes are formed in the resilient plate in such a manner as to be provided at positions spaced apart an equal interval from the central through hole interposed between the fixing holes;

a pair of threaded holes are formed in the mounting surface in face-to-face relation to the fixing holes; and fixing screws are respectively screwed into the threaded holes through the fixing holes in the leg portions, so as to fix the resilient plate to the mounting surface.

3. The optical pickup according to claim 2, wherein the resilient plate comprises a pair of left and right leg portions formed integrally at both side edge portions of a second end portion that is opposite to the first end portion, the leg portions extending toward the first end portion along the horizontal longitudinal direction, wherein the pair of fixing holes are respectively formed in the leg portions.

4. The optical pickup according to claim 3, wherein a support pedestal which is one step higher is integrally formed on an end portion of the mounting surface;

and the leg portions are fixed to the mounting surface so as to press the second end portion of the resilient plate against the support pedestal.

5. The optical pickup according to claim 3, wherein an elongated engaging hole is penetratingly provided in one of the leg portions along the horizontal longitudinal direction;

an elliptical positioning projection is projectingly provided on the mounting surface in face-to-face relation to the engaging hole; and the resilient plate and the leg portions are positioned on the mounting surface by engaging the positioning projection with the engaging hole.

6. The optical pickup according to claim 3, wherein the resilient plate comprises a pair of left and right hinge portions formed by cutting out a slit in the vicinity of the second end portion.

7. The optical pickup according to claim 6, wherein a photodiode fixing portion of the resilient plate on which the printed circuit board is secured is inclined upward by a predetermined angle with respect to each of the leg portions before being hightwise adjusted by the adjusting screw.

8. The optical pickup according to claim 2, wherein the pair of fixing holes are formed in the resilient plate in such a manner as to be provided on a transverse phantom line passing through a central portion of the resilient plate and at positions spaced apart an equal interval from a longitudinal phantom line passing through the central portion of the resilient plate and extending in the horizontal longitudinal direction; and the pair of threaded holes are formed in the mounting surface in such a manner as to be provided on a transverse phantom line passing through a central portion of the base and extending in the horizontal transverse direction and at positions spaced apart an equal interval from a longitudinal phantom line passing through the central portion of the base and extending in the horizontal longitudinal direction.

9. The optical pickup according to claim 3, wherein the pair of fixing holes are formed in the resilient plate in such a manner as to be provided on a transverse phantom line passing through a central portion of the resilient plate and at positions spaced apart an equal interval from a longitudinal phantom line passing through the central portion of the resilient plate and extending in the horizontal longitudinal direction; and the pair of threaded holes are formed in the mounting surface in such a manner as to be provided on a transverse phantom line passing through a central portion of the base and extending in the horizontal transverse direction and at positions spaced apart an equal interval from a longitudinal phantom line passing through the central portion of the base and extending in the horizontal longitudinal direction.

* * * * *